United States Patent [19]
Alkire et al.

[11] Patent Number: 4,598,580
[45] Date of Patent: Jul. 8, 1986

[54] INFLATABLE SEAL FOR AN ANNULAR CAVITY

[75] Inventors: Gerald R. Alkire, North Coventry Township, Montgomery County; Woodrow W. Frank, Jr., West Chester, both of Pa.; Robert W. Thompson, Alief, Tex.

[73] Assignee: Westinghouse Electric Corp., Pittsburgh, Pa.

[21] Appl. No.: 719,109

[22] Filed: Apr. 2, 1985

[51] Int. Cl.⁴ ............................................. G01N 19/08
[52] U.S. Cl. ....................................................... 73/104
[58] Field of Search ...................... 73/104, 118, 49.8; 49/477

[56] References Cited

U.S. PATENT DOCUMENTS 3,339,931  9/1967  Hundt et al. ...................... 49/477 X

FOREIGN PATENT DOCUMENTS 2358802  5/1975  Fed. Rep. of Germany ........ 73/104

Primary Examiner—Jerry W. Myracle
Attorney, Agent, or Firm—F. J. Baehr, Jr.

[57] ABSTRACT

An inflatable seal for an annular cavity which is to be filled with magnetic rubber mold material utilized to inspect surfaces lining the cavity. The seal comprises an oblong tubular member sealed on each end and formed into a circle with the sealed ends engaged to form a circular ring. A conduit connects into the tubular member so that the seal may be inflated and deflated and a plurality of conduits pass through the tubular member a predetermined distance to position the seal within the cavity and provide means for supplying rubber mold material to the seal portion of the cavity and bleed air or evacuate the cavity as the rubber mold material is being injected thereto.

10 Claims, 3 Drawing Figures

INFLATABLE SEAL FOR AN ANNULAR CAVITY

BACKGROUND OF THE INVENTION

This invention relates to an inflatable seal for an annular cavity and more particularly to a seal for an annular cavity into which rubber mold material is injected to inspect cylindrical surfaces forming the cavity for cracks and other surface defects. Tre-pan slots or annular cavities are disposed adjacent steam inlet nozzles in both the steam turbine casing and inner cylinders. Such cavities are utilized to provide for rapid temperature changes in the inlet steam nozzle, however these arrangements do not prevent the rapid temperature changes, but merely reduce the stresses produced by these changes. Therefore, the juncture of the nozzle and the casing and inner cylinder is an area which may be subject to temperature induced stress cracking. Thus, it has become necessary to inspect these surfaces for cracks and other surface imperfections. The confined area does not lend itself to visual inspection and rubber magnetic molding material such as M45793HJ manufactured by Dynamold, Inc. is injected into the cavity and allowed to set. The set rubber mold material is then removed and inspected to determine if there are cracks or other surface defects in the steam inlet nozzle or the sleeve adjacent thereto. Herebefore, wooden and brass sleeves have been fitted into the cavity to form a seal so that the magnetic rubber molding material could be injected into the area being inspected, however the wooden and brass sleeves were difficult to fit in the slots so as to form an effective seal, required considerable experience and was very time consuming.

SUMMARY OF THE INVENTION

A seal for an annular cavity which is to be filled with a magnetic rubber mold material utilized to inspect the surfaces of the cavity, when made in accordance with this invention, comprises a tubular member sealed on each end thereof and formed into a circle with the sealed ends engaging to form a circular ring, means for inflating the tubular member to form a seal within the cavity, means for supplying magnetic rubber molding material through the tubular member and into the cavity, and means for sealing the seam between engaged ends.

BRIEF DESCRIPTION OF THE DRAWINGS

The objects and advantages of this invention will become more apparent by reading the following detailed description in conjunction with the accompanying drawings, in which.

DESCRIPTION OF THE PREFERRED EMBODIMENT

Figure 1:
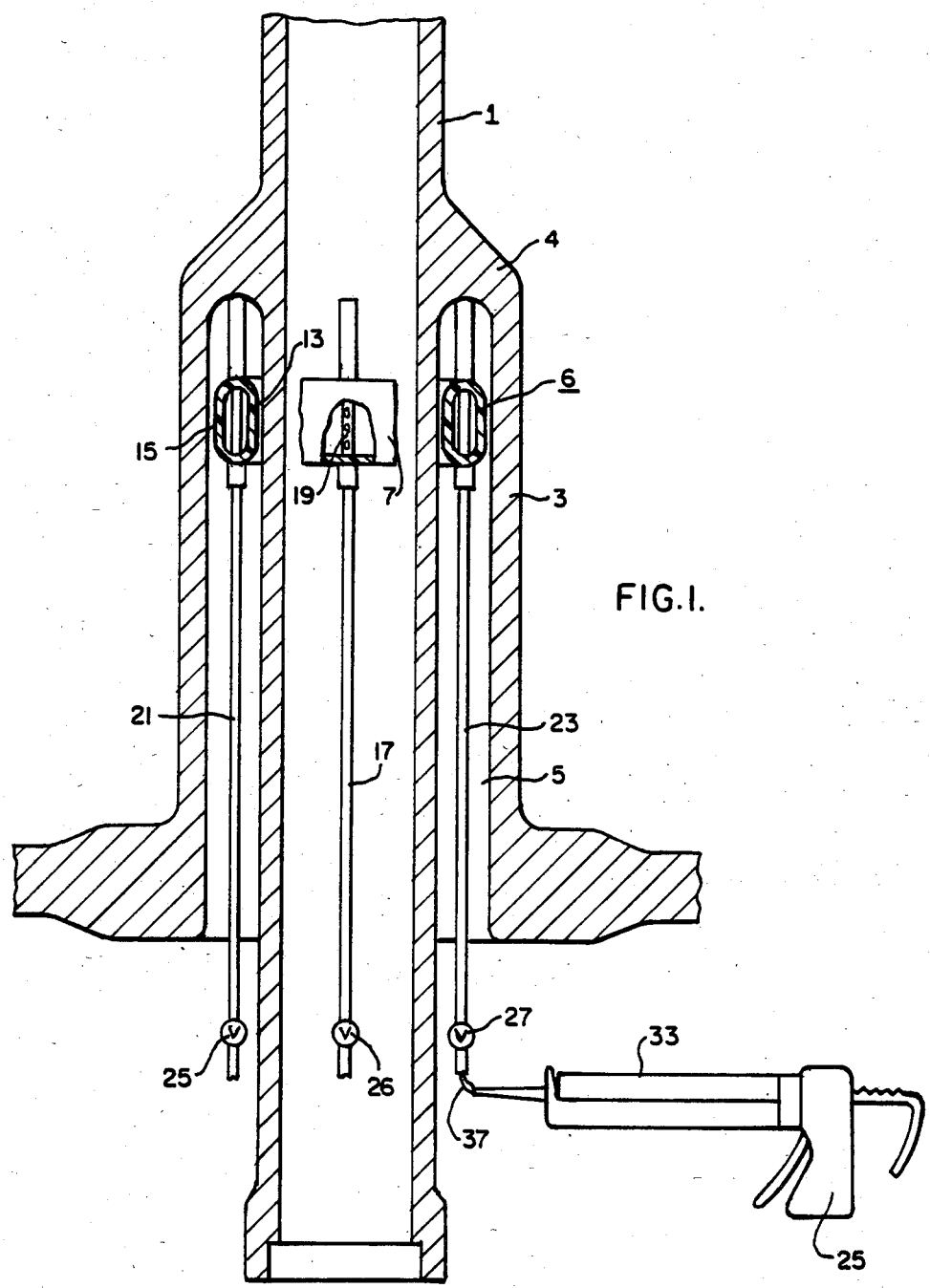
FIG. 1 is a partial sectional view of an inlet nozzle of a steam turbine with an inflatable seal made in accordance with this invention disposed in an annular cavity adjacent the inlet nozzle.
Figure 3:
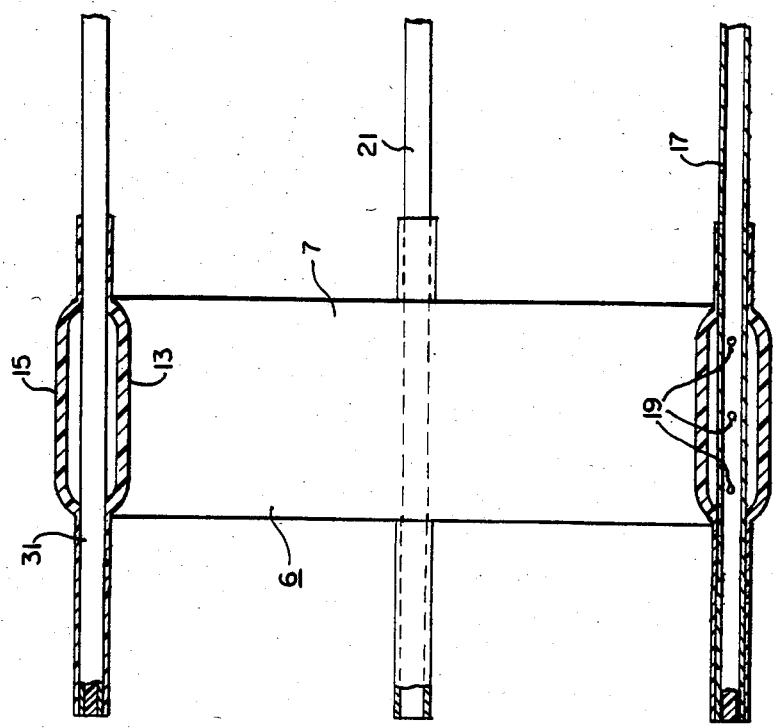
FIG. 3 is a sectional view taken on line III—III of FIG. 2.
Figure 2:
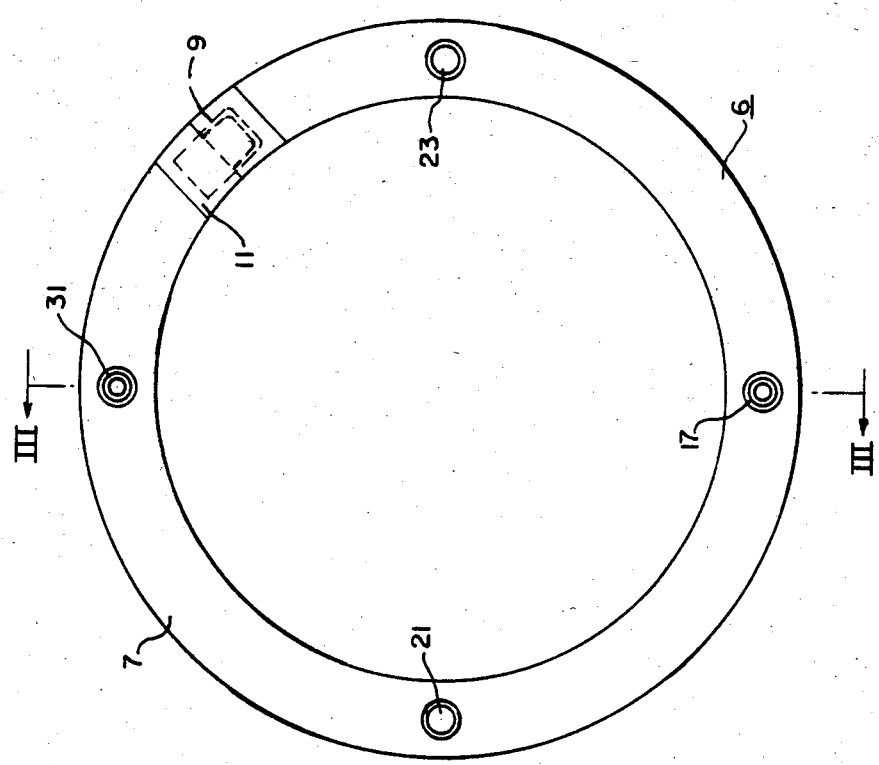
FIG. 2 is an enlarged plan view of the inflatable seal.

Referring now to the drawings in detail and in particular to FIG. 1 there is shown an inlet nozzle for a steam turbine (not shown), the inlet nozzle 1 is attached to a sleeve 3 which is affixed to the turbine casing 4. Between the sleeve 3 and the nozzle 1 is an annular space or cavity 5 which is open only on one end. A seal 6 is shown disposed within the cavity in its deflated state. The seal 6 as shown in FIGS. 2 and 3 comprises an elastomer tubular member 7 closed on both ends and formed into a circular ring. The closed ends of the tubular member 7 engage and interlock. The ends of the tubular member 7 are formed into male and female configuration as generally indicated at 9 providing means for interlocking the ends thereof. The tubular member 7 is generally oblong having generally flat opposing sides 13 and 15. A sleeve 11 is also fitted over the ends of the tubular member to improve the seal at this juncture. Preferably, the sleeve 11 is attached to one end of the tubular member 7 and fits over the other end thereof.

An inflation tube or conduit 17 extends through the tubular member 7 and holes 19 therein provide means for inflating the tubular member 7 and forming a seal within the cavity 5. One end of the conduit 17 is closed or sealed and a valve 20 is provided on the other end to control the flow of air to and from the tubular member 7. A plurality of tubes or conduits 21 and 23 extend through the tubular member 7 a predetermined distance to hold the seal 6 off the bottom of the cavity 5 and have valves 25 and 27, respectively, connected to the conduits 21 and 23 to provide means for evacuating or bleeding air from the bottom of cavity 4 and for supplying rubber mold material thereto. The conduits 21 and 23 are sufficiently long, or are provided with extensions so that they can be utilized to position and move the seal 6 within the cavity 5. Equally spaced around the seal 6 is dummy or closed tubular member and extensions 31 generally spaced 90° from the conduits, and extensions 21 and 23 and cooperating therewith and with the conduit 17 to provide stops so that the seal 6 may be easily positioned a predetermined distance from the inner end of the cavity 5.

To inspect the cavity 5 it is sand blasted, cleaned and sprayed with WD40 or another light machine oil. The seal 6 is also sprayed with a light machine oil and wrapped around the inlet nozzle 1. The ends of the seal 6 are brought into engagement and the attached sleeve 11 is placed or pulled over the seam at the ends of the engaged tubular member 7 to prevent the rubber magnetic molding material from leaking through the seam when filled and pressurized. The seal 6 is pushed into the cavity 5 until the extensions contact the inner end thereof. The seal 6 is then inflated with about 15 pounds of air through the conduit 19 and valve 20. A tube of magnetic rubber compound 33 is placed in a caulking gun 35 and connected to the conduit 23 utilizing Tygon tubing 37 or some other flexible tubing and the bleed line 21 is opened. Rubber material is injected into the cavity 5 utilizing the caulking gun 35 until the rubber material begins to extrude from the end of the conduit 21. Then the valve 25 is closed and the caulking gun 35 is utilized until the back pressure makes it difficult to pump. Then the valve 27 is closed. The rubber material is allowed time to set up. When the rubber has cured, the seal 6 is deflated by opening the valve 20 and the seal 6 and rubber mold material is removed from the cavity 5. The rubber mold material is cut adjacent the juncture of the ends of the tubular member 7 forming the seal 6 and is removed from the seal so that it may be inspected as it now mirrors the surface deep within the cavity 5.

The seal 6 herebefore described is advantageously made as a slit ring which may be fitted over the inlet nozzle, yet the ends engage to form a good seal. An inflatable and deflatable seal also provides easy installation and removal of the seal 6 from the cavity 5.

We claim:

1. A seal for an annular cavity which is to be filled with a magnetic rubber mold material utilized to inspect surfaces lining said cavity, said seal comprising:

a tubular member sealed on each end thereof and formed into a circle with the sealed ends thereof engaging to form a circular ring;

means for inflating said tubular member to form a seal within said cavity; and means for supplying magnetic rubber mold material through said tubular member and into said cavity.

2. A seal as set forth in claim 1, wherein the tubular member is formed from an elastomer and is flattened on two sides when not inflated.

3. A seal as set forth in claim 2, wherein the means for supplying rubber mold material to said cavity is a conduit extending through the tubular member.

4. A seal as set forth in claim 3 and further comprising means for evacuating or bleeding air from said cavity.

5. A seal as set forth in claim 4, wherein the means for evacuating or removing air from said cavity comprises another conduit extending through said tubular member.

6. A seal as set forth in claim 5, wherein the conduits extend a predetermined distance beyond the tubular member.

7. A seal as set forth in claim 1, wherein the sealed ends of the tubular member interlock.

8. A seal as set forth in claim 7, wherein one sealed end of the tubular member is concave and the other sealed end of the tubular member is convex providing an interlock therebetween.

9. A seal as set forth in claim 1 and further comprising a sleeve which fits over the ends of the tubular member.

10. A seal as set forth in claim 9, wherein the sleeve is attached to one end of the tubular member and fits over the other end.

* * * * *